United States Patent [19]
Blair

[11] Patent Number: 5,677,404
[45] Date of Patent: Oct. 14, 1997

[54] TETRAFLUOROETHYLENE TERPOLYMER

[75] Inventor: Leslie Mitchell Blair, Parkersburg, W. Va.

[73] Assignee: E. I. Du Pont de Nemours and Company, Wilmington, Del.

[21] Appl. No.: 606,132

[22] Filed: Feb. 23, 1996

Related U.S. Application Data

[60] Provisional application No. 60/002,403, Aug. 17, 1995.
[51] Int. Cl.$^6$ .................................................. C08F 16/24
[52] U.S. Cl. ............................................................ 526/247
[58] Field of Search ............................................. 526/247

[56] References Cited

U.S. PATENT DOCUMENTS 5,266,639  11/1993  Chapman, Jr. et al. ............... 525/200

FOREIGN PATENT DOCUMENTS 0075312  3/1983  European Pat. Off. ............... 526/247

Primary Examiner—Joseph L. Schofer
Assistant Examiner—N. Sarofim

[57] ABSTRACT

Copolymers of tetrafluoroethylene, hexafluoropropylene, and perfluoro(ethyl vinyl ether) can be extruded at much higher rates than corresponding copolymers containing perfluoro(propyl vinyl ether).

5 Claims, No Drawings

TETRAFLUOROETHYLENE TERPOLYMER

This is a continuation-in-part of U.S. patent application Ser. No. 60/002,403, filed Aug. 17, 1995 by the same inventor.

FIELD OF THE INVENTION

This invention is in the field of melt-fabricable copolymers of tetrafluoroethylene.

BACKGROUND OF THE INVENTION

Carlson in U.S. Pat. No. 4,029,868 (1977) discloses the improvement of melt-fabricable copolymers of tetrafluoroethylene (TFE) and hexafluoropropylene (HFP) containing 4–12 wt % HFP by incorporation of 0.5–3 wt % of either perfluoro(ethyl vinyl ether) or perfluoro(propyl vinyl ether) into the copolymer. The resultant terpolymer is also melt-fabricable, has improved high temperature tensile strength without diminished flex life, and exhibits snap-back so as to be useful as heat shrinkable tubing. The polymerization is carried out using the solvent process or the aqueous dispersion process using added solvent as described by Carlson in U.S. Pat. Nos. 3,528,954 and 3,642,742, respectively. The HFP content corresponds to an infrared HFP index (HFPI) range of 0.9 to 2.7, using the multiplicative factor 4.5 disclosed to convert HFPI to HFP content in wt %. Example 13 discloses a TFE/HFP/PEVE terpolymer (4.5 wt % HFP and 1.2 wt % PEVE) as providing high toughness, but most of the Examples are directed to TFE/HFP/PPVE terpolymer.

McDermott & Pierkarski in SIR H310 (1986), subsequent to Carlson, demonstrated the preference for TFE/HFP/PPVE terpolymer by disclosing only this polymer for achieving improved stress crack resistance, obtaining this improvement with an HFP content of 9–17 wt % and PPVE content of 0.2–2 wt %. The HFP content corresponds to an HFPI range of about 2.8–5.3, using the multiplicative factor 3.2 disclosed to convert HFPI to HFP content in wt %. The non-aqueous polymerization procedure of the Carlson '954 and '868 patents are referenced. Aqueous dispersion polymerization is also disclosed, with optional addition of unreactive fluorocarbon phase to promote monomer diffusion or to solubilize the initiator. The goal of SIR H310 was to increase stress crack resistance at the same copolymer melt viscosity or to allow a faster extrusion rate while keeping the stress crack resistance at a high level. The problem solved by SIR H310 involved a trade off between extrusion rate and stress crack resistance. Provision of copolymer having a melt viscosity which enabled faster extrusion was done at some sacrifice in stress crack resistance.

As is common in the field, both Carlson and McDermott & Piekarski base HFP content on measurement of HFPI. This quantity was introduced by Bro & Sandt in U.S. Pat. No. 2,946,763 which pertains to TFE/HFP copolymers. Bro & Sandt also introduced the multiplicative factor 4.5 to obtain HFP content in wt % from HFPI. While recent calibrations have led to different multiplicative factors, HFPI values deduced from infrared measurements at different times are generally regarded as reliable.

A TFE/HFP copolymer resin that can be extruded faster without sacrifice of stress crack resistance is desired.

SUMMARY OF THE INVENTION

The present invention provides both high extrusion rate and high stress crack resistance essentially by using PEVE in place of PPVE in a TFE/HFP/PEVE terpolymer composition having a greater amount of HFP than present in the '868 terpolymer. The maximum extrusion rate is not only high but, surprisingly, exceeds that which is obtainable with the terpolymer of SIR H 130, without sacrifice in stress crack resistance.

Thus, the present invention can be defined as a partially-crystalline copolymer comprising tetrafluoroethylene, hexafluoropropylene in an amount corresponding to HFPI of from 2.8 to about 5.3, and from 0.2% to 3% by weight of perfluoro(ethyl vinyl ether).

DETAILED DESCRIPTION OF THE INVENTION

It has been discovered that TFE/HFP/PEVE copolymer resin of this invention can be extruded at rates surprisingly higher than possible with corresponding TFE/HFP/PPVE copolymer. In melt extrusion of TFE/HFP/PEVE resin as wire insulation, it is possible to run at wire speeds 1.5×as fast as with counterpart resin containing PPVE, a very substantial and commercially significant improvement.

As illustrated by examples to follow, TFE/HFP/PEVE copolymer of this invention remarkably exhibits no melt fracture in capillary rheometry at shear rates substantially in excess, e.g., at least 2×, of the shear rates at which counterpart resin containing PPVE instead of PEVE exhibits gross melt fracture.

As also illustrated by examples to follow, TFE/HFP/PEVE copolymer of this invention can also be subjected to greater and more rapid melt draw than counterpart resin containing PPVE. Melt draw ("drawing down") is a technique employed in processing of certain fluoropolymers to enhance rate otherwise limited by melt fracture in extrusion, i.e., by using a die with a relatively large opening and drawing the extruded melt to desired final dimensions. Melt draw is commonly characterized by the draw down ratio calculated as the ratio of the cross-sectional area of the die opening to the cross-sectional area of the finished extrudate.

The TFE/HFP/PEVE copolymers of this invention have HFP content corresponding to HFPI=2.8–5.3, preferably HFPI=2.8–4.7. For reasons of productivity in polymerization, HFP content corresponding to HFPI= 2.8–4.1 is especially preferred. HFPI is determined by an infrared method outlined below.

PEVE content of the copolymers of this invention is in the range 0.2–3 wt %, preferably 0.4–2 wt %. PEVE content in the copolymer is determined by an infrared method, also outlined below.

One skilled in the art will recognize that one or more additional copolymerizable monomers can be incorporated in the TFE/HFP/PEVE copolymers of this invention. The amount of such additional monomer will be such that the resultant copolymer is partially crystalline, as indicated by detection of a melting endotherm by differential scanning calorimetry for resin aspolymerized, i.e., for resin that has not been previously melted.

Copolymers of this invention generally have melt viscosity (MV) in the range $0.5-50\times10^3$ Pa.s. MV in the range $1-10\times10^3$ Pa.s is preferred.

As one skilled in the art will recognize, other physical properties of the copolymers of this invention will generally vary with HFPI, PEVE content, and MV. With the multiplicity of combinations possible under the ranges described above, it is virtually impossible to set values for such other properties that characterize the copolymers of this invention as a group. However, current commercial interest is in resins having MIT Flex Life of generally at least 2000 or 3000 cycles, preferably at least 4000 cycles. As is well known in the art, stress cracking or brittleness, and flex life, are very much dependent on the thickness of an article in use. Copolymer having higher MIT Flex Life, measured on specimens having a standard thickness, should be used for better toughness in thicker sections, whereas copolymer having lower MIT Flex Life can have equivalent toughness when used in thinner sections. Such thinner sections are encountered, for example, in films, in small-diameter wire insulations, and in cell walls of foam structures.

The TFE/HFP/PEVE copolymers of this invention can be made by any method of polymerization that yields generally homogeneous copolymer composition. Such methods include polymerization in aqueous media, polymerization in non-aqueous media, and polymerization in mixed media. Organic liquids used in the latter two polymerization systems commonly are halogenated compounds. In light of current environmental concerns about such compounds, aqueous dispersion polymerization is preferred. Such a process is disclosed, for example, for TFE/HFP/PPVE copolymer in SIR H130.

For aqueous polymerization, a broad range of temperatures can be used. Because of the low reactivity of HFP relative to that of TFE, higher temperatures are advantageous, such as temperatures in the range of about 95°–115° C. Temperature in the range 98°–108° C. is preferred for making the copolymers of this invention by the aqueous semibatch process used in the examples below. Surfactants used in emulsion polymerization appear to be less effective at temperatures above 103°–108° C. and there is a tendency to lose dispersion stability.

Surfactants suitable for use in dispersion polymerization of TFE/HFP copolymers can be used. Such surfactants include, for example, ammonium perfluorooctanoate (C-8), ammonium perfluorononanoate (C-9), and the perfluoroalkyl ethane sulfonic acids and salts thereof disclosed in U.S. Pat. No. 4,380,618.

Initiators commonly employed in emulsion polymerization of TFE copolymers are water-soluble free-radical initiators such as ammonium persulfate (APS), potassium persulfate (KPS), or disuccinic acid peroxide. APS and/or KPS is preferred.

After the reactor is charged with water, surfactant and monomers, heated to the chosen temperature, and agitation is started, a solution of initiator is added at a prescribed rate to initiate polymerization. A pressure drop is the usual indicator that polymerization has started. Then, TFE addition is started and controlled according to the scheme chosen to regulate the polymerization. An initiator solution, which can be the same as or different from the first initiator solution, is usually added throughout the reaction.

There are several alternatives for regulating the rate of TFE/HFP copolymerization, and these are applicable for polymerizing the TFE/HFP/PEVE copolymers of this invention. It is common with most alternatives first to precharge all HFP monomer and then to add TFE to the desired total pressure. Additional TFE is then added after initiator injection and reaction kickoff to maintain the chosen pressure. The TFE may be added at a constant rate, with agitator speed changed as necessary to increase or decrease actual polymerization rate and thus to maintain constant total pressure. Alternatively, the total pressure and the agitator speed may both be held constant, with TFE added as necessary to maintain the constant pressure. A third alternative is to carry out the polymerization in stages with variable agitator speed, but with steadily increasing TFE feed rates.

The HFP monomer is much less reactive than the TFE monomer so that the HFP/TFE ratio must be kept high to assure a high incorporation of HFP.

The PEVE can be incorporated into the copolymer by either pre-charge, pre-charge plus subsequent addition (pumping), or pumping of the PEVE into the reactor. The reactivity of PEVE relative to TFE is such that TFE/HFP/PEVE copolymer that is satisfactorily uniform with respect to PEVE incorporation can be obtained if PEVE is precharged to the reactor.

EXAMPLES

Fluoropolymer compositions were determined on 0.095–0.105 mm thick films pressed at 300° C., using Fourier transform infrared spectroscopy. For HFP determination, the method described in U.S. Pat. No. 4,380,618 was used. In applying this method, the absorbances of bands found at about 10.18 micrometers and at about 4.25 micrometers were used. HFP content is expressed as an HFP index (HFPI), the ratio of the 10.18 micrometers absorbance to the 4.25 mm absorbance. HFP content in wt % was calculated as 3.2×HFPI.

PEVE was determined from an infrared band at 9.17 micrometers. PEVE content in wt % was calculated as 1.3×the ratio of the 9.17 micrometers absorbance to 4.25 micrometers absorbance. The absorbance at 9.17 micrometers was determined using a TFE/HFP dipolymer reference film to subtract out a strong absorbance that overlies the 9.17 micrometers band. The 4.25 mm internal thickness absorbance was determined without use of reference film.

Melt viscosities of the fluoropolymers were determined by ASTM method D1238-52T modified as described in U.S. Pat. No. 4,380,618.

Thermal characteristics of fluoropolymer resins were determined by DSC by the method of ASTM D-4591-87. The melting temperature reported is the peak temperature of the endotherm on second melting.

Average size of polymer particles as polymerized, i.e., raw dispersion particle size (RDPS), was measured by photon correlation spectroscopy.

The standard MIT folding endurance tester described in ASTM D-2176 was used for determining flex life (MIT Flex Life). Measurements were made using compression-molded films that were quenched in cold water. Film thickness was 0.008±0.0005 inch (0.20±0.013 mm).

In the following, unless otherwise stated, stated solution concentrations are based on combined weight of solvent water and of solute(s). Stated concentrations of polymer solids in dispersions are based on combined weights of solids and aqueous medium, and were determined gravimetrically, i.e., by weighing dispersion, drying, and weighing dried solids, or by an established correlation of dispersion specific gravity with the gravimetric method.

Example 1

A cylindrical, horizontal, water-jacketed, paddle-stirred, stainless steel reactor having a length to diameter ratio of about 1.5 and a water capacity of 80 parts by weight was charged with 50 parts of demineralized water and 0.36 part of a 20 wt % solution of ammonium perfluorooctanoate surfactant (C-8, Fluorad® FC-143, 3M) in water. With the reactor paddle agitated at 35 rpm, the reactor was heated to 65° C., evacuated, purged with TFE, and evacuated again. The reactor temperature then was increased to 103° C., and 0.22 part (calculated from 711 mmHg pressure rise) of liquid PEVE was injected into the reactor. After the temperature had become steady at 103° C., HFP was added slowly to the reactor until the pressure was 437 psig (3.1 MPa). Then TFE was added to the reactor to achieve a final pressure of 600 psig (4.2 MPa). Then 0.39 part of a freshly prepared aqueous initiator solution containing 0.80 wt % of ammonium persulfate (APS) and 0.80 wt % potassium persulfate (KPS) was charged into the reactor at 0.1 part/min. Then, this same initiator solution was pumped into the reactor at 0.013 part/min for the remainder of the polymerization. After polymerization had begun as indicated by a 10 psig (0.07 MPa) drop in reactor pressure, additional TFE was added to the reactor to maintain pressure constant at 600 psig (4.2 MPa) until a total of 17.5 parts of TFE had been added to the reactor after kickoff. Total reaction time was 175 min with a TFE addition rate of 0.1 part/min. The reaction rate was maintained constant by adjusting the agitator speed. At the end of the reaction period, the TFE feed and the initiator feed were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. Solids content of the dispersion was 28.1 wt % and raw dispersion particle size (RDPS) was 0.188 µm. After mechanical coagulation, the polymer was isolated by compressing excess water from the wet polymer and then drying this polymer in a 150° C. convection air oven. The TFE/HFP/PEVE terpolymer had an MV of 2.70×10³ Pa.s, an HFPI of 4.06 (13.1 wt % HFP), a PEVE content of 0.68 wt %, and a melting point of 241 ° C. This polymer was stabilized by heating at 360° C. for 1.5 hr in humid air containing 13 mol % water. A film molded of stabilized copolymer resin then had an MIT Flex Life of 10,900 cycles to break, showing that PEVE terpolymers of this invention have good flex life.

Control A

The procedure of Example 1 was generally repeated except that 0.33 part of PPVE was used instead of PEVE, HFP was charged to a pressure of 435 psig (3.1 MPa), and the pumping rate for initiator solution throughout the batch was 0.009 part/min. Solids content of the dispersion was 29.9 wt % and raw dispersion particle size (RDPS) was 0.176 µm. The TFE/HFP/PPVE terpolymer had an MV of 2.08×10³ Pa.s and a melting point of 252° C. By high-temperature ¹⁹F NMR measurement, it was determined that HFP content was 12.0 wt % (corresponding to HFPI=3.75) and PPVE content was 0.85 wt %. A film molded of stabilized copolymer resin then had an MIT Flex Life of 6200 cycles to break.

Examples 2–7

The procedure of Example 1 was essentially followed, except for differences noted in Table 1. The notation "nc" indicates no change from Example 1. Product properties are also summarized in the Table. The data show that PEVE terpolymers of this invention have excellent flex life.

TABLE 1

Conditions and Results for Examples 2–7

| Example: | 2 | 3 | 4 | 5 | 6 | 7 |
| --- | --- | --- | --- | --- | --- | --- |
| Run Conditions: | | | | | | |
| PEVE precharge (part) | 0.21 | 0.31 | 0.32 | 0.32 | 0.36 | 0.41 |
| HFP pressure (MPa) | nc | nc | 2.9 | 2.5 | 2.5 | nc |
| Initiator pumping (part/min) | 0.011 | 0.009 | 0.011 | 0.014 | 0.012 | 0.006 |
| Dispersion properties: | | | | | | |
| Solids (wt %) | 30.3 | 31.2 | 28.1 | 24.2 | 24.8 | 31.2 |
| RDPS (µm) | 0.197 | 0.184 | 0.182 | 0.196 | 0.194 | 0.180 |
| Resin properties: | | | | | | |
| MV (10³ Pa·s) | 3.28 | 3.32 | 2.86 | 4.09 | 3.32 | 5.60 |
| HFPI | 4.16 | 3.73 | 3.59 | 3.16 | 3.13 | 3.69 |
| HFP content (wt %) | 13.3 | 11.9 | 11.5 | 10.1 | 10.0 | 11.8 |
| PEVE content (wt %) | 0.60 | 1.40 | 1.06 | 1.00 | 1.27 | 1.40 |
| Melting point (°C.) | 248 | 243 | 245 | 253 | 253 | 245 |
| MIT Flex Life (cycles) | 12700 | 15400 | 8980 | 4090 | 5150 | 34100 |

Example 8

TFE/HFP/PEVE terpolymer resin produced by the general procedure of Example 1 and having HFPI=3.69, PEVE content of 0.71 wt %, and MV=2.37×10³ Pa.s was evaluated by capillary rheometry at 350° C. using an Instron® capillary rheometer. Tungsten carbide dies with capillary diameter of 0.0762 cm, capillary length of 2.54 cm, and 90° entrance angle were used. By varying the rate of polymer extrusion through the capillary die, shear rates in the range of from 10.4 s⁻¹ to 3470 s⁻¹ were achieved. The extrudate was observed to be smooth and undistorted over the entire shear rate range studied, exhibiting no sign of melt fracture, even at the highest shear rate attained. In contrast, a TFE/HFP/PPVE terpolymer control resin having HFPI=3.55, PPVE content of 0.82 wt %, and MV=2.44×10³ Pa.s exhibited a smooth extrudate at shear rates below 104 s⁻¹, but exhibited sharkskin-like surface melt fracture at shear rates above 104 s⁻¹ that increased in severity with increasing shear rate so that the extrudate became grossly distorted at shear rates above 1000 s⁻¹.

Example 9

The same TFE/HFP/PEVE terpolymer resin used in Example 8 was evaluated under uniaxial extension at 350° C. using a Goettfert Rheotens® Tensile Tester for Polymer Melts. In this test, an evenly extruded melt strand is gripped between two counter-rotating wheels that elongate the strand with constant acceleration until the strand breaks. The velocity of the strand achieved at break is a measure of the extensional properties of the polymer and is an indication of the ability of the polymer to be melt drawn. The polymer was extruded at a shear rate of 9.648 s$^{-1}$ through a capillary die with capillary diameter 0.2 cm, capillary length 1 cm, and 180° entrance angle to form a melt strand. The strand was extruded vertically downward for a distance of 10.7 cm where is was gripped between two counter rotating wheels that elongated the melt strand with constant acceleration of 0.24 cm/s$^2$. The strand elongated smoothly to a final take away velocity of 120 cm/s, the maximum velocity attainable with the available apparatus. In contrast, the TFE/HFP/PPVE terpolymer control resin used in Example 8 elongated smoothly only up to a take away velocity of 51 cm/s, at which point the strand began to neck down and to undergo gross fluctuations in strand thickness. The melt strand eventually broke at a take away velocity of 77 cm/s.

Example 10 and Control B

The TFE/HFP/PEVE copolymer resin of Example 8 was used to extrude insulation onto AWG 24 solid copper conductor (20.1 mil=0.51 mm diameter), using a Nokia-Maillefer 60-mm extrusion wire line in a melt draw extrusion technique. The extruder had length/diameter ratio of 30/1 and was equipped with a conventional mixing screw (See Saxton, U.S. Pat. No. 3,006,029) to provide a uniform melt. Die diameter was 0.32 inch (8.13 mm), guide tip diameter was 0.19 inch (4.83 mm), and land length was 0.75 inch (19 mm). Draw down ratio was 97. Cone length was 2 inch (51 mm) and the air gap to a water quench was 33 ft (10 m). The temperature profile, other running conditions, and results are shown in Table 2 for extrusions starting at 1500 ft/min (456 m/min) and increasing to 3000 ft/min (914 m/min) in several increments. At higher speed, the process became unstable. The high extrusion speed achieved with very low incidence of spark failures, for thin-walled (0.164 mm) insulation, shows the performance advantage of the TFE/HFP/PEVE copolymer of this invention. In contrast, similar extrusion of a TFE/HFP/PPVE terpolymer control resin having HFPI=3.22, PPVE content of 0.93 wt %, and MV=2.54×10$^3$ Pa.s could be could be carried out at speeds up to about 1900 ft/min (579 m/min). Conditions and results are shown in Table 3. At higher speed, the process became unstable.

TABLE 2

Extrusion Summary for Example 10

Temperatures (°F./°C.)

| | | | | | | |
|---|---|---|---|---|---|---|
| Rear | ←←←←←← | 695/368 | →→→→→→ | | | |
| Center rear | ←←←←←← | 725/385 | →→→→→→ | | | |
| Center | ←←←←←← | 735/391 | →→→→→→ | | | |
| Center front | ←←←←←← | 735/391 | →→→→→→ | | | |
| Front | ←←←←←← | 740/393 | →→→→→→ | | | |
| Clamp | ←←←←←← | 740/393 | →→→→→→ | | | |
| Adapter | ←←←←←← | 740/393 | →→→→→→ | | | |
| Crosshead | ←←←←←← | 740/393 | →→→→→→ | | | |
| Die | ←←←←←← | 765/407 | →→→→→→ | | | |
| Melt | 757/403 | 760/404 | 762/406 | 767/408 | 771/411 | 774/412 |
| Wire preheat | ←←←←←← | 280/138 | →→→→→→ | | | |

TABLE 2-continued

Extrusion Summary for Example 10

Running conditions

| | | | | | | |
|---|---|---|---|---|---|---|
| Wire speed (m/min) | 457 | 549 | 610 | 732 | 853 | 914 |
| Pressure (MPa)* | 7.0 | 8.1 | 8.7 | 9.1 | 9.6 | 11.6 |

Extrudate properties

| | | | | | | |
|---|---|---|---|---|---|---|
| Diameter (mm) | 0.84 | 0.84 | 0.84 | 0.84 | 0.84 | 0.84 |
| Capacitance (pF/m) | 195 | 194 | 194 | 195 | 192 | 187 |
| Length coated (km) | 9.1 | 13.0 | 14.3 | 14.3 | 14.3 | 14.3 |
| Spark failures | 1 | 0 | 2 | 1 | 3 | 4 |

*Pressure at crosshead

TABLE 3

Extrusion Summary for control B

Temperatures (°F./°C.)

| | | | |
|---|---|---|---|
| Rear | 688/364 | ←←← | 685/363 →→→ |
| Center rear | ←←←←←← | 720/382 | →→→→→→ |
| Center | ←←←←←← | 730/388 | →→→→→→ |
| Center front | 735/391 | ←←← | 730/388 →→→ |
| Front | 740/393 | ←←← | 730/388 →→→ |
| Clamp | 745/396 | ←←← | 735/391 →→→ |
| Adapter | 750/399 | ←←← | 735/391 →→→ |
| Crosshead | 760/404 | ←←← | 745/396 →→→ |
| Die | 760/404 | ←←← | 765/407 →→→ |
| Melt | 757/403 | 764/407 | 765/407 |
| Wire preheat | ←←←←←← | 250/121 | →→→→→→ |

Running conditions

| | | | |
|---|---|---|---|
| Die diameter (mm) | 7.67 | 7.11 | 7.11 |
| Tip diameter (mm) | 4.83 | 4.45 | 4.45 |
| Cone length (mm) | 51 | 38 | 38 |
| Draw down ratio | 99 | 86 | 86 |
| Wire speed (m/min) | 305 | 518 | 579 |
| Pressure (MPa)* | 5.1 | 10.7 | 11.4 |

Extrudate properties

| | | | |
|---|---|---|---|
| Diameter (mm) | 0.79 | 0.79 | 0.79 |
| Capacitance (pF/m) | 220 | 179 | 191 |
| Length coated (km) | 9.1 | 18.3 | 18.3 |
| Spark failures | 0 | 4 | 4 |

*Pressure at crosshead

I claim:

1. A partially-crystalline copolymer comprising tetrafluoroethylene, hexafluoropropylene in an amount corresponding to HFPI of from 2.8 to about 5.3, and from 0.2% to 3% by weight of perfluoro(ethyl vinyl ether).

2. The copolymer of claim 1, wherein the amount of perfluoro(ethyl vinyl ether) is from 0.5% to 2.5% by weight.

3. The copolymer of claim 2, wherein the amount of said hexafluoropropylene corresponds to HFPI of from 2.8 to 4.1.

4. The copolymer of claim 1, wherein said copolymer has a melt viscosity of no more than 10×10$^3$ Pa.s.

5. The copolymer of claim 1, wherein said copolymer has an MIT Flex Life of at least 2000 cycles.

* * * * *